United States Patent [19]

Watkins et al.

[11] Patent Number: 5,680,523

[45] Date of Patent: Oct. 21, 1997

[54] SYSTEMS AND METHODS FOR DEVELOPING THREE-DIMENSIONAL DATA THROUGH THE IDENTIFICATION OF CURVES ON A PERSPECTIVE SKETCH

[75] Inventors: Mark A. Watkins, Salt Lake City; Carl S. Petersen, Park City, both of Utah

[73] Assignee: Parametric Technology Corporation, Waltham, Mass.

[21] Appl. No.: 726,863

[22] Filed: Oct. 4, 1996

Related U.S. Application Data

[63] Continuation of Ser. No. 333,834, Nov. 3, 1994, abandoned.

[51] Int. Cl.$^6$ .................................................. G06F 15/00
[52] U.S. Cl. ............................................................ 395/119
[58] Field of Search ................................ 395/117, 119, 395/120, 118

[56] References Cited

U.S. PATENT DOCUMENTS

| | | | |
|---|---|---|---|
| 4,602,286 | 7/1986 | Kellar et al. | 358/183 |
| 4,633,416 | 12/1986 | Walker | 364/521 |
| 4,646,251 | 2/1987 | Hayes et al. | 364/518 |
| 5,155,813 | 10/1992 | Donoghue et al. | 395/275 |
| 5,237,647 | 8/1993 | Roberts et al. | 395/119 |
| 5,251,160 | 10/1993 | Rockwood et al. | 364/578 |
| 5,343,220 | 8/1994 | Veasy et al. | 345/199 |

FOREIGN PATENT DOCUMENTS

| | | |
|---|---|---|
| 2140257 | 11/1994 | United Kingdom. |
| 2157122 | 10/1996 | United Kingdom. |

OTHER PUBLICATIONS

Dutta et al, "Reconstruction of Curved Solids from Two Polygonal Orthographic Views," Computer Aided Design, vol. 24, No. 3, pp. 149-159, Mar. 1992 (abstract only).

Weidong, "A Regular Curved Object's CSG-Rep Reconstruction from a Single 2D Line Drawing," Proceedings of the SPIE—The International Society of Optical Engineering, vol. 1608, pp. 119-127, 1992. (abstract only).

Sakurai, Hiroshi and Gossard, David C., "Solid Model Input Through Orthographic Views", *Computer Graphics*, Jul, 1983, vol. 17, No. 3, pp. 243-247, U.S.

Courter, S. Mark and Brewer, John A. III, "Automated Convention of Curvilinear Wire-Frame Models to Surface Boundary Models; A Topological Approach", *Siggraph*, Aug., 1986, vol. 20, No. 4, pp. 171-178, U.S.

J.D. Foley et al., "Computer Graphics Principles and Practice", 2nd Edition, Chapter 11 (1990).

K. Inoue, "System-G Enables Real-Time 3D Texture Mapping", *JEE J. Electronic Eng.*, Tokyo, Japan, vol. 27, pp. 64-67 (1990).

P. Haeberli, "Paint By Numbers: Abstract Image Representations", *Computer Graphics*, vol. 24, pp. 207-214 (Aug. 1990).

P. Haeberli et al., "Texture Mapping as a Fundamental Drawing Primitive", 8 pages (Fourth Eurographics Workshop on Rendering, Paris, France—Jun. 1993).

M. Drabick, "Commodore Amiga Blessed with Mature, Yet Low Cost 2-D, 3-D Software", Computer Pictures VII, Issue No. 2, p.38(2) (Mar.-Apr. 1993).

"Ray Dream Designer 3.0 Slated To Ship In Sep. Aug. 20, 1993", Newsbytes News Network, p. N/A (Aug. 1993).

(List continued on next page.)

*Primary Examiner*—Phu K. Nguyen
*Assistant Examiner*—Cliff N. Vo
*Attorney, Agent, or Firm*—Lahive & Cockfield, LLP

[57] ABSTRACT

A sketch of an object is entered into a computer graphics system which interfaces an operator to receive further criteria enabling the development of three-dimensional model of the sketched object. A box, defining perspective planes is established about the object after which various curves are entered, further defining surface positions of the object. The curves are classified and individually resolved to attain the three-dimensional model using transformations between screen space and model space. Once developed, the model enables a multitude of displays variously showing the object.

28 Claims, 5 Drawing Sheets

OTHER PUBLICATIONS

M.E. Clemens et al., "Graphics Innovation, Apple's EWorld Highlight Lively Macworld Expo.", Seybold Report on Desktop Publishing, vol. 8, p. 38(12)(Feb. 1994).

Japanese Publication—S. Furishima et al., "Generation of 3–Dimentional geometric model from rough–sketch" Dept. of Mechanical Engineering, Tokyo Institute of Technology (date unknown).

SYSTEMS AND METHODS FOR DEVELOPING THREE-DIMENSIONAL DATA THROUGH THE IDENTIFICATION OF CURVES ON A PERSPECTIVE SKETCH

This application is a continuation of application Ser. No. 08/333,834 filed on Nov. 3, 1994, now abandoned.

BACKGROUND OF THE INVENTION

Although the world is three dimensional, human communication and expression primarily involves two dimensional media. Since time immemorial, architectural, engineering, and other drawings have utilized several planar views to express three dimensional objects, e.g., plan views, elevations and so on. On occasion, perspective drawings have also have been used; however, though somewhat satisfying to the eye, they are invariably ambiguous and uncertain. Accordingly, perspective views alone do not effectively define objects in detail.

The two dimensional aspect of drawing media has been perpetuated in the form of two dimensional viewing screens. In that regard, with viewing screens, computer graphics have considerably advanced the facility to represent objects. In early graphics systems, representations were two dimensional (2D), objects enabled having length and width, but no depth. Later systems enabled the development of representative data for three dimensional (3D) objects to be stored in computer memory. A problem has been the economical and effective development of such data.

For many purposes, multiple perspective displays are desirable and useful for depicting three dimensional objects. As indicated such displays are available, once comprehensive three dimensional data is stored to represent the objects. However, one of the problems is enabling a user to define a 3D object with essentially a 2D medium, e.g., a computer screen.

A multitude of devices are known for providing data to a computer through operator interaction. Specifically, forms of such devices are described in a book entitled *Computer Graphics: Principles and Practice*, 2nd edition, published in 1990 by Addison-Wesley Publishing Company, Inc. and written by Foley, van Dam, Finer and Hughes; specifically, see chapters 4 and 8. As suggested above, using such devices, an operator may provide 2D views of an object that are resolved by the computer system into a single 3D database representative of the object. Various other techniques have been recognized for constructing a 3D solid model of an object in computer memory. Specifically, a system using orthographic views is disclosed in an article entitled "Solid Model Input Through Orthographic Views" by Sakurai and Gossard, published in Computer Graphics, Jul. 1983, Volume 17, Number 3 (ACM 0-89791-109-1/83/007/0243). A later article disclosed an alternative; "Automated Conversion of Curvilinear Wire—Frame Models to Surface Boundary; a Topological Approach" published in Siggraph '86 by Courter and Brewer (ACM 0-89791-196-2/86/008/0171). However, a need continues for an effective, economical, convenient and fast system to develop 3D object data.

SUMMARY OF THE INVENTION

In general, the system of the present invention is responsive to current needs for producing a three dimensional representation of an object whose appearance is known only from a single view. Specifically, an interactive graphic computer is loaded with data for a perspective sketch that is displayed. The user is afforded the capability to define a plurality of perspective planes as to specify a "box" in the perspective of the object. With a "box" specified, a rudimentary relationship is established between the three dimensional space and the displayed image. Accordingly, the user can define curves, specified as to type, with the consequence that curves and surfaces are resolved by the computer processor. That is, when a particular curve is defined on top of the sketched object, its two dimensional information is established. With known coordinates, the three dimensional representation of the curve or object can be computed utilizing transformation matrices. Note that the determination depends on the type of curve being defined. Accordingly, curve types are specified. As curves are specified and resolved, depending on the complexity of the object, ultimately the system resolves all sections of the object attaining a comprehensive three dimensional specification. Utilizing such data, the system can display the object in a multitude of views as specified. That is, as indicated above, once an object is defined in three dimensions by computer data, it can be displayed in a variety of views and projections including perspective. Techniques and geometrical transformations to accomplish various views are disclosed in the above-referenced book, *Computer Graphics: Principles and Practice*, see chapter 5. A book, *Principles of Interactive Computer Graphics*, 2nd edition, published 1979 by McGraw-Hill, Inc., by Newman and Sproul, also discloses transformations (see chapter 22) along with transformation hardware (see section beginning on page 419).

BRIEF DESCRIPTION OF THE DRAWINGS

In the drawings, which constitute a part of the specification, an exemplary embodiment of the invention is set forth as follows.

DESCRIPTION OF THE ILLUSTRATIVE EMBODIMENT

As indicated above, a detailed illustrative embodiment of the present invention is disclosed herein. However, image displays, data formats, interactive computer components, structures, memory organization and other elements in accordance with the present invention may be embodied in a wide variety of forms, some of which may be quite different from those of the disclosed embodiment. Consequently, the specific structural and functional details disclosed herein are merely representative; yet in that regard, they are deemed to afford the best embodiment for purposes of disclosure and to provide a basis of the claims herein which define the scope of the present invention.

Figure 1:
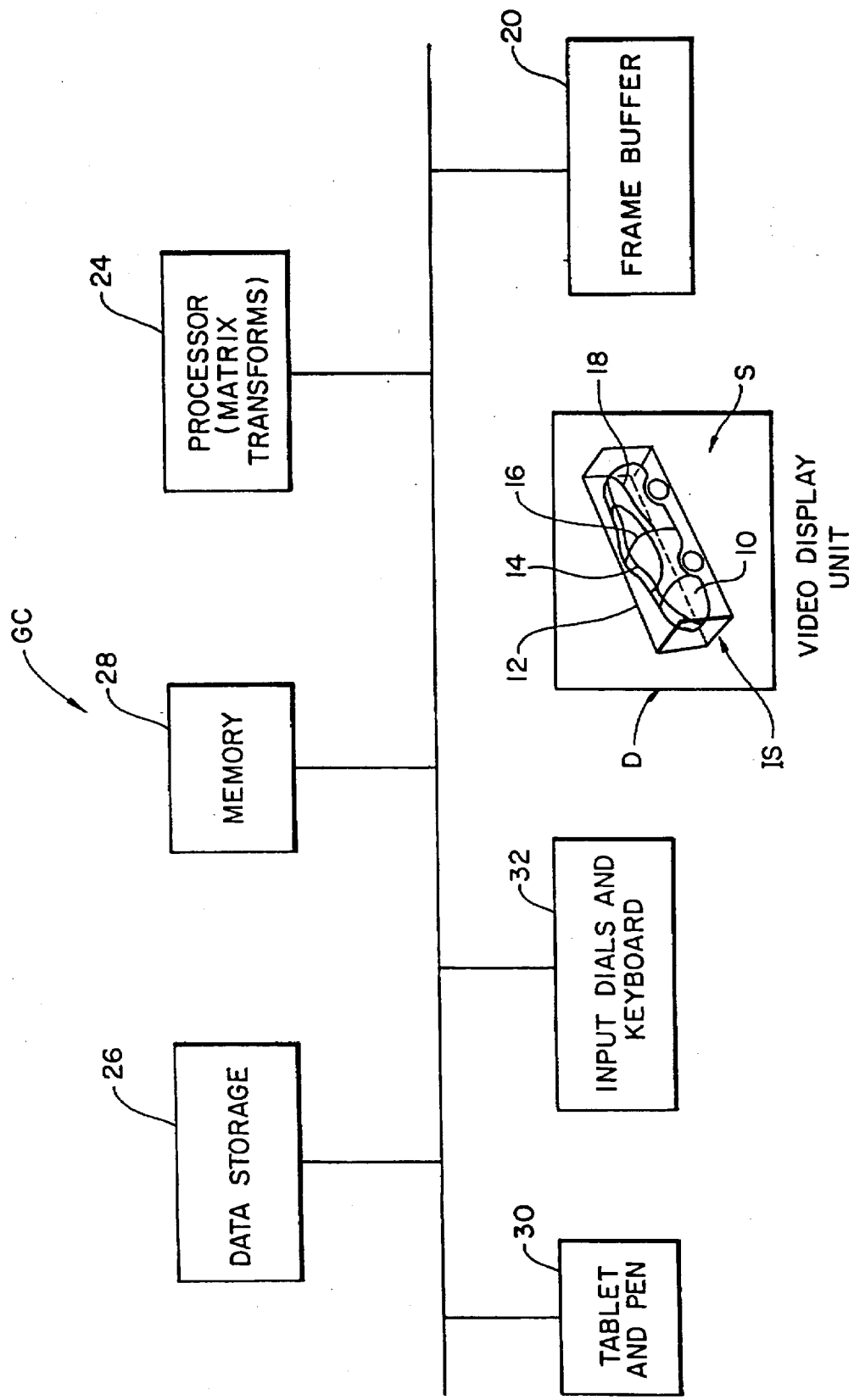
FIG. 1 is a block diagram of a system constructed in accordance with the present invention.

Referring initially to FIG. 1, a system is represented in the form of an interactive graphics computer, as for use in modeling. Incidentally, modeling operations are treated in the above-referenced book, *Principles of Interactive Computer Graphics*, in a section beginning at page 337.

A video display unit D is illustrated in the system, incorporating a screen S displaying an image IS. Generally, the image IS results from signals supplied to the display unit D from an interactive graphics computer GC, components of which are treated in greater detail below.

The image IS shows a vehicle 10 enclosed by a line parallelepiped or box 12. In accordance herewith, by relating the sketch of the vehicle 10 to the box 12, data is developed by the graphics computer GC representing the vehicle 10 as a three dimensional object in world space. Accordingly, a multitude of views showing the vehicle 10 in a multitude of positions are readily available.

To develop the three dimensional representative data, the user defines curves to represent features of the vehicle 10. As illustrated, a center line 14 specifies the longitudinal center plane of the vehicle 10. An x-section 16 reveals a major cross section through the vehicle 10. A character line 18 indicates a surface. It is a line for which no assumptions are made about the coordinates of points on the curve. As disclosed in detail below, as curves are defined, the representative data is processed by the graphics computer GC, ultimately to attain the desired three dimensional representation.

Before considering the graphics computer GC in greater detail, it is noteworthy that interactive graphic computers are well known that have the capability to receive, process and display objects derived from three dimensional data. Specifically, such techniques are disclosed in the above referenced books which are hereby incorporated by reference. In that regard, the basic structural elements of the graphics computer GC as depicted in FIG. 1 are known apart from the philosophical combination of the present invention.

The video display unit D is driven by a frame buffer 20 that stores data representative of individual picture elements (pixels) of a display. Typically, the pixel storage locations of the frame buffer 20 are scanned sequentially in a raster pattern to derive an analog signal that drives the video display unit D. Details of such operation and the performing structure are disclosed in the above-referenced book, Computer Graphics: Principles and Practice, see the section beginning at page 165.

The frame buffer 20 is connected to a bus 22 controlled by a processor 24 to facilitate organized communication with other elements of the graphics computer GC. Specifically, the bus 22 is coupled to a data storage 26 and a memory 28 to accomplish data processing operations. As indicated above, various input structures may take different forms, however, as illustrated in FIG. 1, a tablet and pen 30 along with input dials and a keyboard 32 are connected to the bus 22. Thus, an operative interactive graphics computer system is illustrated in relation to an accomplished image IS.

Figure 2:
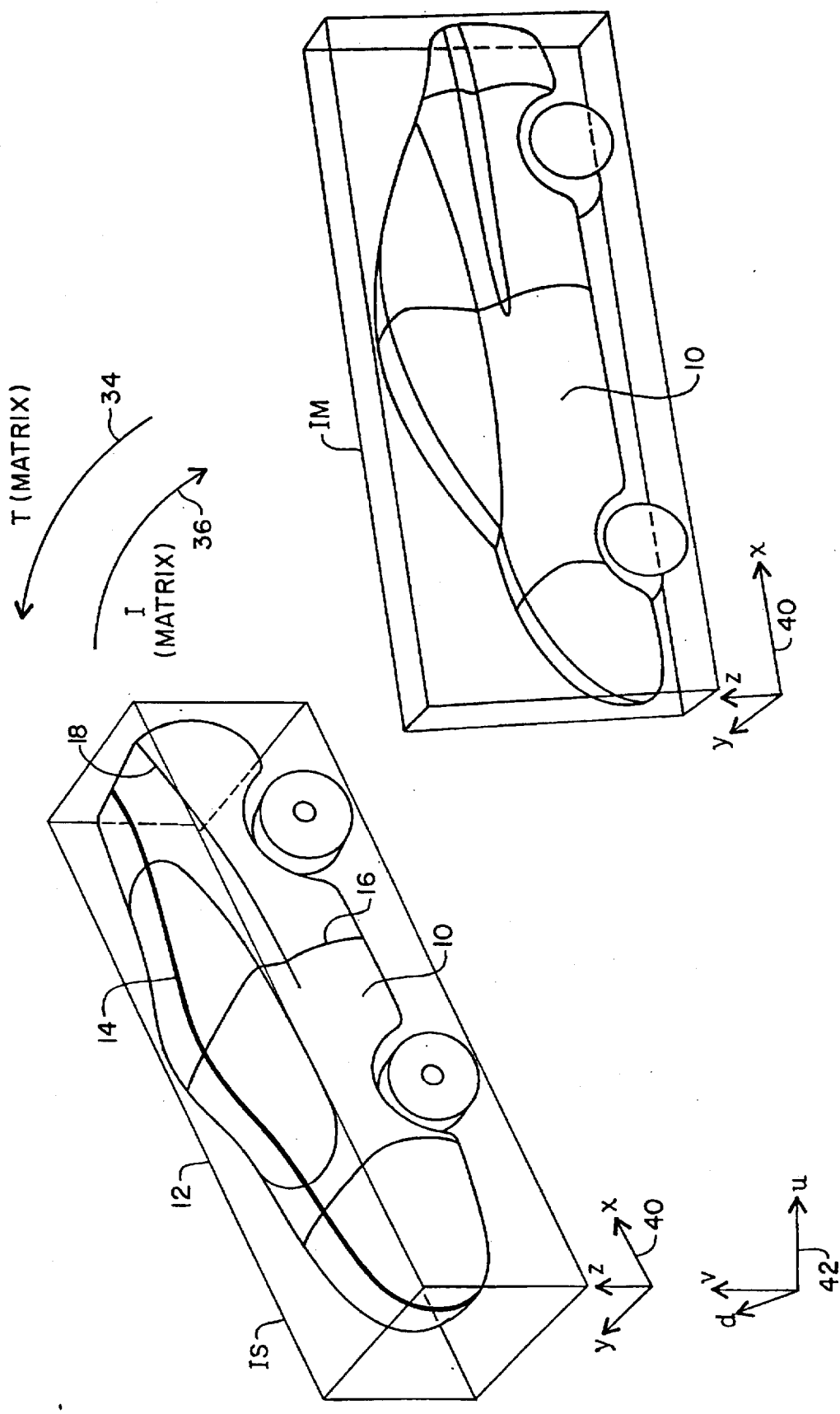
FIG. 2 is a pictorial representation illustrating images displayed by the system of FIG. 1.

Prior to considering the detailed operation of the system of FIG. 1, some preliminary consideration of the process and operating philosophy is deemed to be appropriate. In that regard, FIG. 2 shows to the left the image IS enlarged, in screen space, somewhat as illustrated in FIG. 1. Additionally, in FIG. 2, an image IM to the left is depicted in model space. Generally, the image IS illustrates the development of three dimensional object data while the image IM illustrates an exemplary perspective view derived from developed three dimensional data. A detailed treatment of the different coordinate systems or spaces and related transformations is presented in a section beginning at page 279 of the above-referenced book, *Computer Graphics: Principles and Practice*.

Recapitulating to some extent, the image IS illustrates the interactive steps in screen space for developing three dimensional data of the vehicle 10 in model space. The image IM simply illustrates one of a multitude of views available once the three dimensional data has been developed.

Considering the process in greater detail, the initial step involves attaining the vehicle 10 in screen space as illustrated in FIG. 2. Essentially, a perspective of the vehicle 10 may be accomplished utilizing the tablet and pen 30 or any of a variety of computer paint programs as well known in the art. Alternatively, a sketch could be scanned into the graphics computer GC utilizing available apparatus and techniques.

With the completion of a sketch depicting the vehicle 10, the user next defines a "view box", specifically, the box 12. In this step, using input structure, as the tablet and pen 30 or the input dials and keyboard 32, the user defines the appearance that a box would have if it were drawn in the same view and perspective as the vehicle 10, i.e., the object in question. The box 12 defines for the graphics computer GC a four-by-four matrix known as a transformation matrix hereinafter called T. That is, the matrix T defines a transformation which converts (x, y, z) 3D coordinates into "screen space" in (u, v, d) coordinates. Note that such coordinates are treated in the referenced section beginning at page 279 of the book, *Computer Graphics: Principles and Practice*.

The u and v coordinates define the location of the point on the screen, and the "d" coordinate defines the depth of a point into or "behind" the computer screen. The matrix T can be inverted, defining a transformation matrix I which converts screen space (u, v, d) coordinates to three dimensional (x, y, z) coordinates. Referring to FIG. 2, as illustrated by an arrow 34, the matrix I converts from screen space to model space, while an arrow 36 illustrates the operation of the matrix T for converting from model space to screen space.

With the box 12 defined, the user next defines curves, either as a planar section or as a character line. In FIG. 2, the center line 14 and the section 16 represent planar sections while the line 18 typifies a character line. Essentially, the user builds curves that overlay the sketch or vehicle 10 intended to represent features of the object. When a curve is built, it is first identified as a curve of specific type by utilizing the input dials and keyboard 32 (FIG. 1). Specifically, each curve would be identified as either: a center line, an x section, a y section, a z section or a character line. A center line curve in model space, as typified by the center line 14 (FIG. 2) in screen space, is a curve with a y coordinate defined to be 0. X-sections, y-sections, z-sections are curves whose x, y or z coordinates respectively are known to be a constant value for all points on the curve. Typically, a character line is somewhat contoured and no assumptions can be made about the coordinates of points on such a curve.

Figure 4:
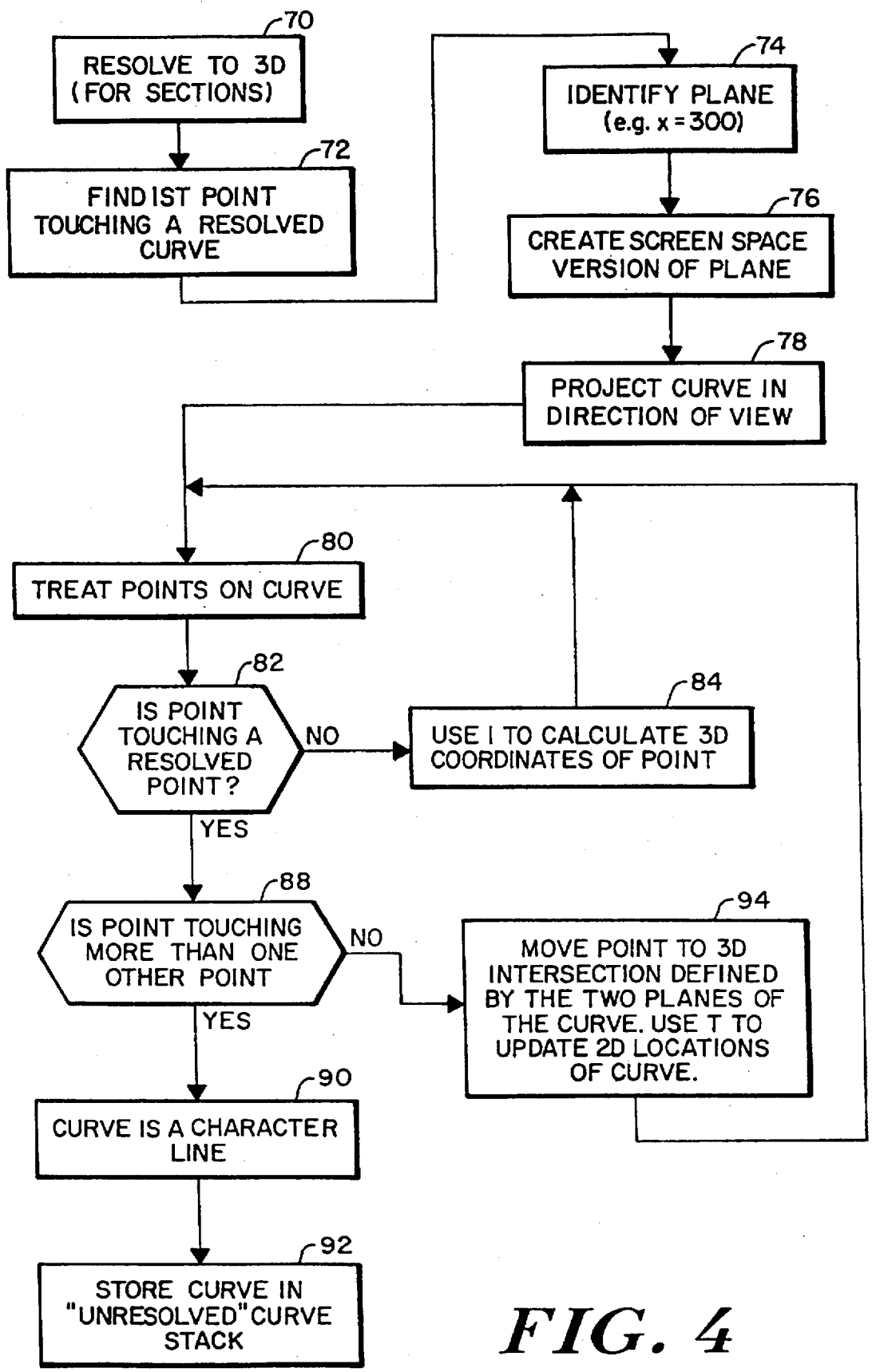
FIG. 4 is a flow diagram illustrating a part of the process of FIG. 3 in greater detail.

As curves are defined, they are resolved from screen space IS to model space IM, using the matrix I as indicated by the arrow 36 in FIG. 4. That is, when a particular curve is defined on the vehicle 10, all of its two dimensional (u, v) information is known. If the "d" coordinate of each coordinate is known, the three dimensional representation of the object can be computed by taking the matrix product of the inverse of the transformation matrix, namely, the matrix I, and the matrix defined by the (u, v, d) coordinate for each point. As indicated above, the manipulation of matrices to accomplish such operations is treated in detail in the referenced books.

The determination of the d coordinate for each point depends on the type of curve being defined. Note the following: a plane in (x, y, z) space indicated by the coordinates 40 has an equivalent plane in (u, v, d) screen space as indicated by the coordinates 42. The equivalent plane is defined by the transformation matrix T indicated by the arrow 36. If a curve is known to be on a particular plane in (x, y, z) or model space, and that curve is defined in (u, v) or two dimensions of screen space, the d coordinate for each point of that curve can be determined by projecting the (u, v) point onto the equivalent plane in the screen space, resulting in a point which has coordinates (u, v, d) for some particular value of d.

To resolve a center line curve (e.g., center line 14), the screen space equivalent of the plane in model space where y equals 0 (y=0) is calculated, the points on the center line are projected onto that equivalent plane and the resulting (u, v, d) points are operated on by the matrix I, resulting in three dimensional coordinates in model space for all defining points of the curve.

To resolve an x, y or z section, a point on such a curve is first found which shares a location with a previously known point. Using the three dimensional coordinates of that location, the three dimensional plane in which the curve resides can be determined. For example, if an x section is being resolved, and is known to cross a point with coordinates (a, b, c), then the x section is known to reside on the plane where x equals a (x=a). Following such a procedure, the screen space version of the curve can be created, the points projected and the three dimensional version of the curve determined.

To resolve a character line, e.g., the character line 18, all sections which cross the character line are initially resolved. Such a resolution defines (u, v, d) coordinates or screen space coordinates for all points on the character line that cross such a section. Then, an interpolating spline function is defined that interpolates the d coordinates at such points. Next, for each point which does not cross a known section, the d coordinate is determined by evaluating the interpolating function at the appropriate position. Then, once all the d values are known, the three dimensional version of the curve can be developed using the above procedure. To maximize the information from crossings with section curves, character lines are resolved in a final step, after all section curves have been defined. The operations are detailed below.

To complete the development, surfaces are computed by the processor 24 from the curves. That is, once all curves have been resolved to three dimensional surfaces, surfaces are created which interpolate the three dimensional curves over the correct regions. This is accomplished utilizing a combination of well known results to determine the appropriate regions and standard interpolation routines present in CDRS, a computer modeling product available from Evans & Sutherland Computer Corp., Salt Lake City, Utah. Accordingly, an effective system is provided for converting two dimensional information to three dimensional information in correspondence with a single perspective sketch whereby the object of the sketch can be effectively displayed. Specifically, the vehicle 10 illustrated as a model space image IM, may be displayed by the video display unit D (FIG. 1) in a multitude of positions from a multitude of view points utilizing established and widely known video graphics techniques. The vehicle 10 is illustrated in one such position, from one such view point in FIG. 2. Others may be readily commanded as by use of the input dials and keyboard 32 (FIG. 1).

Figure 3:
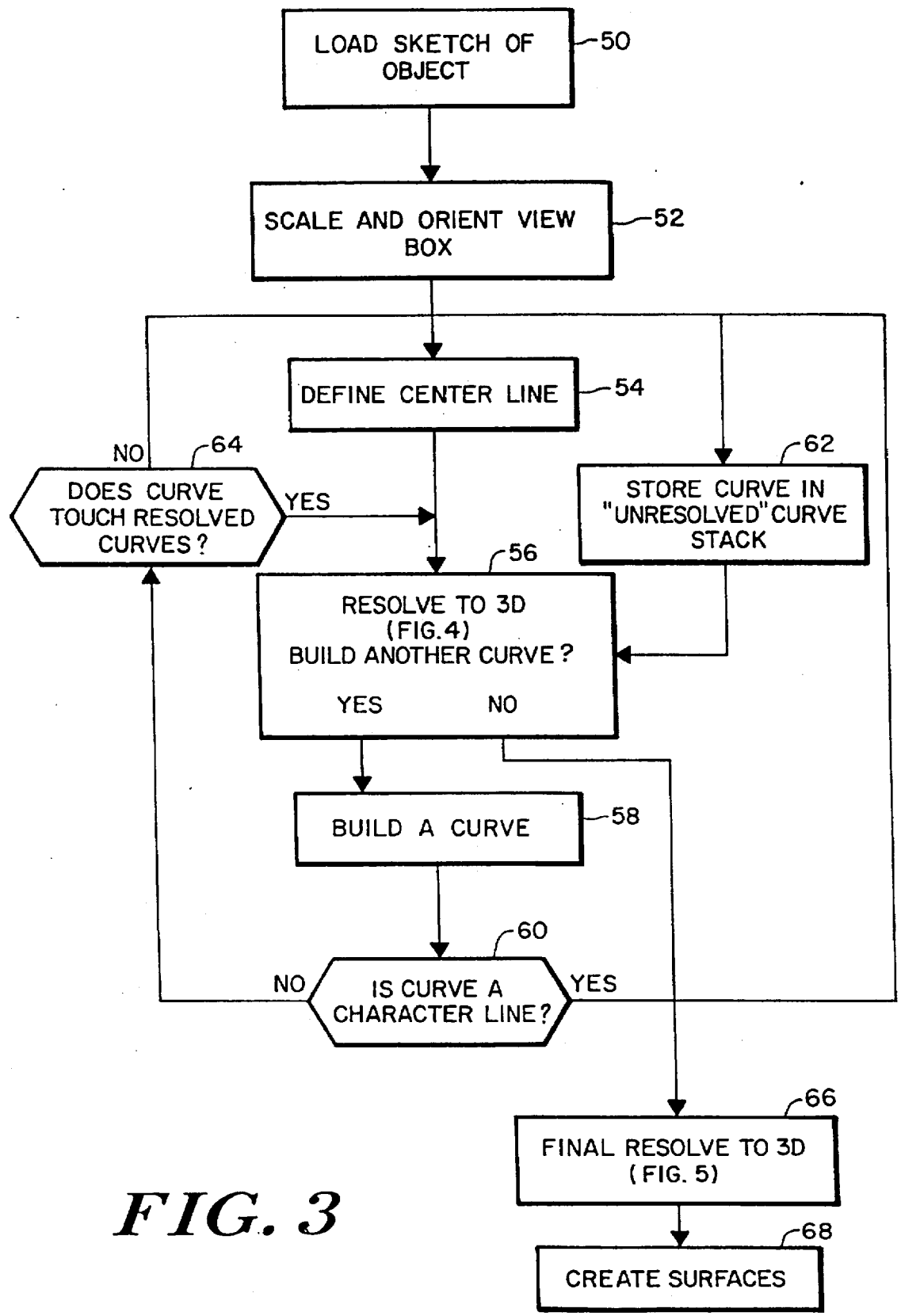
FIG. 3 is a flow diagram illustrating an operating process for the system of FIG. 1.
Figure 5:
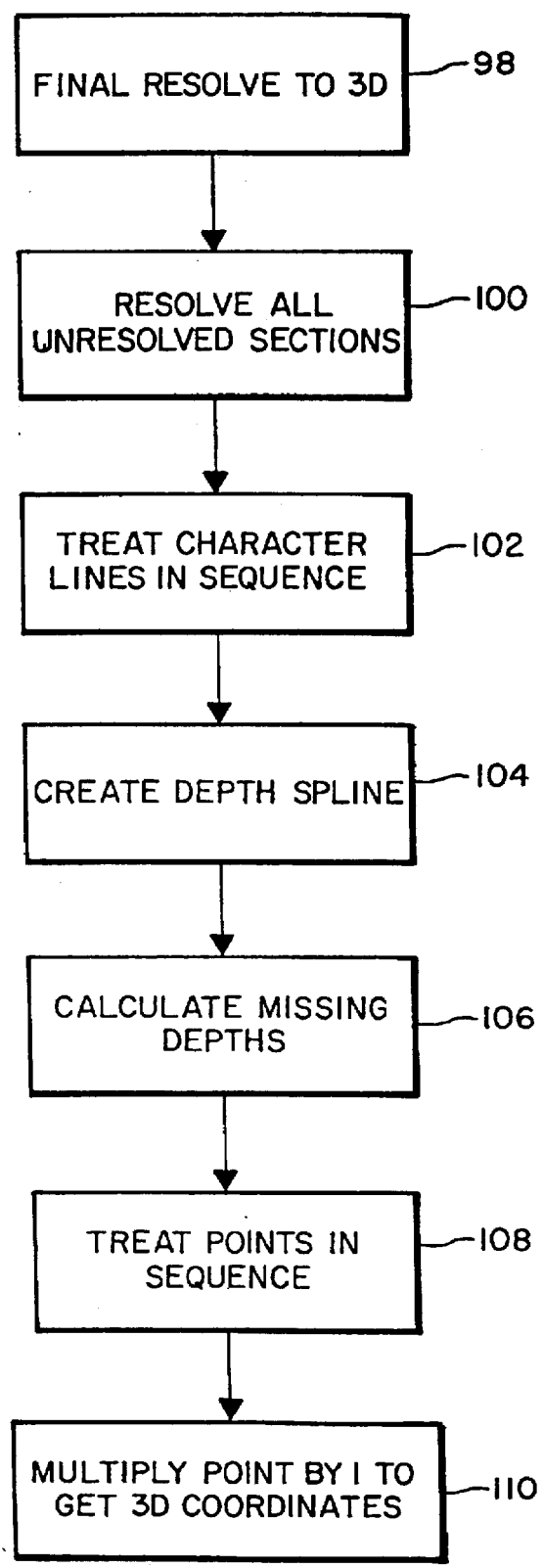
FIG. 5 is a flow diagram illustrating another part of the process of FIG. 3 in greater detail.

Recapitulating to some extent, and to further detail the process in relation to the structure of FIG. 1, reference will now be made to flow diagrams as depicted in FIGS. 3, 4 and 5. The initial operation involves loading the sketch or other representation, e.g., vehicle 10 (FIG. 1) into the graphics computer GC. The operation is represented by the block 50 of FIG. 3 and may be accomplished utilizing the tablet and pen 30 (FIG. 1). Thus, representative data is accomplished in the memory 28 which loads the frame buffer 20 for driving the video display unit D. At that stage, the vehicle 10 is displayed; however, the box 12 is not defined nor shown, its placement being the next operational step.

Again, utilizing input structure as the tablet and pen 30 or the input dials and keyboard 32, the box 12 is scaled and oriented in the image IS as depicted in FIG. 1. The operation is represented by a block 52 in FIG. 3. The next operations involve defining curves.

As represented by a block 54, the center line 14 (FIG. 2) of the vehicle 10 is defined. Again, utilizing conventional techniques and input structures as the tablet and pen 30 along with the dials and keyboard 32, the center line 14 is simply drawn on the vehicle 10.

With the completion of the center line 14 (FIG. 2), the processor 24 (FIG. 1) resolves the curve to three dimensional or model space coordinates as explained above. The operation is performed by the processor 24 (FIG. 1) and is represented by the block 56 in FIG. 3. The detailed operation of resolving the curve is illustrated in the expanded flow diagram of FIG. 4, treated below.

With the resolution of the center line 14, a query is raised as to whether or not another curve should be defined. Of course, as the center line 14 (FIG. 2) is the first curve treated, another curve will be developed. Accordingly, the path from the block 56 is "yes", indicating a step of developing or building another curve, the step being represented by a block 58 in FIG. 3. Of course, the curve might be any of the specific types explained above, and in that regard, it is so designated as by the input dials and keyboard 32. The treatment of the curve depends upon its classification. Specifically, if the curve is a character line, e.g., character line 18, it is simply stored in an "unresolved" curve stack as in the memory 28 (FIG. 1). The classification of the curve is indicated as a query operation by a query block 60 in FIG. 3, with a step of storing character lines as "unresolved" being illustrated by a block 62.

If the curve is not a character line, producing a "no" path from the query block 62, the operation proceeds to another query block 64 for further classification of the curve by operation of the processor 24 (FIG. 1). Specifically, as indicated by the query block 64, the processor 24 determines whether or not the current curve touches resolved surfaces. If not, the curve is currently left unresolved and stored as indicated by the block 62. Conversely, if the curve does touch resolved surfaces, the process proceeds from the query block 62 to the block 56, indicating the resolution of the curve as explained above. With the resolution of such a curve, a test for the need of another curve is posed and process becomes cyclic to treat the curves as explained in detail above. When the test of the block 56 indicates no further curves are to be built, the process proceeds to the operation of a block 66, finally resolving to 3D, after which surfaces are created as indicated by the block 68. The process of finally resolving to 3D as represented by the block 66 is treated in an expanded flow diagram of FIG. 5. However, treatment will first be given to the step of resolving to 3D as represented by the block 56 (FIG. 3) as expanded in FIG. 4.

The operation of resolving to 3D is initially indicated by a block 70 (FIG. 4, top center). In pursuing the resolution, the computer 24 (FIG. 1) scans for a first point touching a resolved curve as indicated by a block 72 (FIG. 4). The collocation identifies a plane as explained above and as illustrated by a block 74. Also, as explained above, the processor 24 creates a screen space version of the plane as indicated by a block 76 then projects the curve in the direction of the view (block 78) and treats the points on the curve (block 80). Treating the points involves an interactive operation initiated by a query illustrated by a block 82. Specifically, the query is whether or not a point touches a resolved point. If not, the matrix I is applied to calculate the 3D coordinates of the point (block 84) after which the process returns to treat the next point.

If the query illustrated by the block 82 produces an affirmative indication, that is, the point touches a resolved point, another query is prompted as illustrated by a block 88. Specifically, the question is whether or not the point touches more than one other point. If so, the curve is recognized as a character line (block 90) and is stored in the "unresolved" stack (block 92).

If the point is not touching more than one other point, the consequence of the query block 88 is negative and the process advances to the step of a block 94. Specifically, the operation is to move the point to a 3D intersection defined by the two planes of the curve. Furthermore, the matrix T is then used to update 2D locations of the curves. Thus, the resolving operations generally represented in FIG. 3 by the block 56 are accomplished in accordance with the flow diagram of FIG. 4.

Referring further to FIG. 3, a block 66 illustrates the step of a final resolution to 3D, which operation is treated in detail in FIG. 5. Specifically, the captioned block 98 is followed by a block 100 representing the step of resolving all unresolved sections. Thereafter, character lines are treated in sequence as indicated by a block 102. A depth line is created (block 104) and missing depths are calculated (block 106). Thereafter, the points are treated in sequence (block 108) in that the matrix I is applied as a multiplier to obtain the 3d coordinates (block 110).

With the data attained in model space representing the vehicle 10 (FIG. 2) commands may be provided, as through the input dials and keyboard 32 to establish various views and view points of the vehicle 10. In the course of such manipulations, a user may desire to modify the form of the vehicle 10. Such operation facilitates desire operations and is relatively easy for the user.

To modify the vehicle 10, the user employs the tablet and pen 30 to define a fresh curve as explained above. Thereafter, a revision order is commanded, using the input dials and keyboard 32 prompting the processor 24 to implement the shape of the fresh curve deleting any conflicting data. Accordingly, the user is facilitated the capability for rapid and simple design modifications along with the ability to selectively view the vehicle 10. Generally, the advantage of such operation is well recognized. However, the system of the present invention represents a considerable improvement in the ease and economy of attaining the requisite three dimensional data.

Recapitulating, in view of the above, it may be seen that the system of the present invention accommodates desirable graphics operations as for utilization in design, modeling and so on. In that regard, the process may be variously implemented and as indicated, individual components of the system may vary significantly as for example in specific physical structures. Accordingly, the scope hereof is deemed properly determined in accordance with the claims as set forth below.

What is claimed is:

1. A computer modeling system for attaining and storing data representative of a three dimensional object comprising:

memory means for storing data;

means for inputting into said computer modeling system a two dimensional perspective representation of said object;

means for providing, in two dimensions, a representation of a three dimensional coordinate system, defining a three dimensional space for said object;

means for providing curve data, in two dimensions, representative of a three dimensional characteristic of said object; and means for resolving said data representative of said three dimensional object in response to said two dimensional representation of said object.

2. A system according to claim 1 wherein said means for resolving comprises means for transforming said curve data between screen space and model space.

3. A system according to claim 2 wherein said means for resolving comprises means for determining a depth coordinate in said screen space.

4. A system according to claim 3 wherein said means for determining a depth coordinate comprises:

means for providing an equivalent plane between said model space and screen space; and means for projecting points onto said equivalent plane.

5. A system according to claim 1 wherein said means for providing a representation of a three dimensional coordinate system comprises means for drawing said three dimensional coordinate system as a box representative of enclosing said object.

6. A system according to claim 1 wherein said means for providing curve data comprises means for drawing a centerline curve through said object.

7. A system according to claim 1 wherein said means for providing curve data comprises means for drawing a cross section curve through said object.

8. A system according to claim 1 wherein said means for providing curve data comprises means for drawing a character line curve on said object.

9. A computer modeling system for attaining and storing data representative of a three dimensional (3D) object comprising:

memory means for storing a perspective-like image in two dimensions of an object;

display means for displaying said perspective-like image of an object as stored in said memory means;

plane means for storing representative data defining a plurality of perspective planes in two dimensions to define a space containing said object; and curve means for further defining in two dimensions said object by specifying and storing representations in said memory means of curves of said object.

10. A system according to claim 9 wherein said plane means comprises a plane drawing device and plane processor structure for drawing said plurality of perspective planes as a box having substantially the perspective of said image and being depicted as enclosing said object as displayed by said display means.

11. A system according to claim 9 wherein said curve means comprises a curve drawing device and curve processor structure for drawing curves of said object including sections.

12. A system according to claim 11 wherein said curve drawing device and curve processor structure enable drawing curves in x, y, z coordinates of said perspective planes.

13. A system according to claim 12 wherein said curves in x, y, z coordinates include a centerline curve through said object.

14. A system according to claim 12 wherein said curves in x, y, z coordinates include an x section curve through said object.

15. A system according to claim 12 wherein said curves in x, y, z coordinates include a y section curve through said object.

16. A system according to claim 12 wherein said curves in x, y, z coordinates include a z section curve through said object.

17. A system according to claim 12 wherein said curves in x, y, z coordinates include a character line on said object.

18. A system according to claim 9 further including means for transforming object data in said memory between screen and model space.

19. A system according to claim 9 wherein said plane means and said curve means include a drawing device.

20. A system according to claim 9 further including means for transforming data definitive of said object to attain desired views.

21. A computer modeling process for storing 3-D object data in a memory comprising the steps of:
   providing a plurality of perspective planes in two dimensions adjacent to said object to define perspective for said object;
   with interactive computer graphics capability, providing curves in two dimensions of said object including at least one section; and
   resolving said curves into model space to provide 3-D data for driving a display device.

22. A process for use with a computer graphics system including a drawing device and a display unit, for developing three-dimensional information from two-dimensional perspective image information of an object, the process including the steps of:
   storing said two-dimensional perspective image information in said computer graphics system;
   manipulating the drawing device in two-dimensions to provide a plurality of planes each having a substantially similar perspective as the image information to define a transform function for resolving the image information into three-dimensional information;
   manipulating the drawing device to provide curve data representative of a curve of the object; and
   resolving the curve data, by operation of said transform function, into three-dimensional information.

23. A process according to claim 22 wherein the step of manipulating the drawing device to provide curve data includes providing a centerline of the object.

24. A process according to claim 22 wherein the step of manipulating the drawing device to provide curve data includes providing a coordinate section (x, y or z) through the object.

25. A process according to claim 22 wherein the step of manipulating the drawing device to provide curve data includes a character line of the object.

26. A process according to claim 22 wherein the step of manipulating the drawing device to provide a plurality of planes includes defining a box around the object.

27. A process according to claim 22 including the further step of transforming data stored in said computer graphics system to display the object from an alternative perspective.

28. A computer modeling system for attaining data representative of a three-dimensional object, comprising:
   memory means for storing a two-dimensional perspective image of the object;
   plane means for generating a plurality of perspective planes each being in substantially the same perspective as said two-dimensional perspective image, for defining a model space;
   transform means for generating as a function of said perspective planes, a transform function for transforming coordinates between the model space and a screen space containing said two-dimensional perspective image;
   curve means for defining screen space coordinates of a curve of said two-dimensional perspective image;
   processor means for determining equivalent planes between said model space and said screen space, and means for projecting said screen space coordinates of said curve onto said equivalent plane within said model space for attaining three-dimensional information of said object.

* * * * *